US010055202B2

(12) United States Patent
Peed

(10) Patent No.: US 10,055,202 B2
(45) Date of Patent: Aug. 21, 2018

(54) BUSINESS PROCESS WORKFLOW SYSTEM

(71) Applicant: Sandhills Publishing Co., Lincoln, NE (US)

(72) Inventor: Thomas J. Peed, Lincoln, NE (US)

(73) Assignee: Sandhills Publishing Co., Lincoln, NE (US)

(*) Notice: Subject to any disclaimer, the term of this patent is extended or adjusted under 35 U.S.C. 154(b) by 426 days.

(21) Appl. No.: 14/179,318

(22) Filed: Feb. 12, 2014

(65) Prior Publication Data

US 2014/0229227 A1 Aug. 14, 2014

Related U.S. Application Data

(60) Provisional application No. 61/764,039, filed on Feb. 13, 2013.

(51) Int. Cl.
*G06Q 10/00* (2012.01)
*G06F 8/34* (2018.01)
*G06F 8/35* (2018.01)
*G06F 8/36* (2018.01)

(52) U.S. Cl.
CPC .......... *G06F 8/34* (2013.01); *G06F 8/35* (2013.01); *G06F 8/36* (2013.01)

(58) Field of Classification Search
CPC ...... G06Q 10/06; G06Q 10/0633; G06F 8/34; G06F 8/35; G06F 8/36
See application file for complete search history.

(56) References Cited

U.S. PATENT DOCUMENTS

| 5,734,837 | A | * | 3/1998 | Flores | G06Q 10/06311 |
| | | | | | 705/7.13 |
| 5,930,512 | A | | 7/1999 | Boden et al. | |
| 6,636,242 | B2 | * | 10/2003 | Bowman-Amuah | ................ |
| | | | | | G06F 17/30607 |
| | | | | | 715/733 |
| 6,868,413 | B1 | | 3/2005 | Grindrod et al. | |
| 7,184,967 | B1 | | 2/2007 | Mital et al. | |
| 7,454,310 | B2 | | 11/2008 | Moffat et al. | |
| 7,499,951 | B2 | | 3/2009 | Mueller et al. | |
| 7,555,459 | B2 | * | 6/2009 | Dhar | A61J 9/00 |
| | | | | | 705/38 |
| 7,735,022 | B2 | * | 6/2010 | Danninger | G06Q 10/02 |
| | | | | | 715/829 |

(Continued)

FOREIGN PATENT DOCUMENTS

| WO | 9956193 A2 | 11/1999 |
| WO | 9956193 A3 | 11/1999 |

OTHER PUBLICATIONS

Joseph Wilk, Alexandra Russo, Jim Cunningham, 2004, Dynamic Workflow Pulling the Strings, pp. 1-161.*

(Continued)

*Primary Examiner* — Matthew S Gart
*Assistant Examiner* — Stephen S Swartz
(74) *Attorney, Agent, or Firm* — Milligan PC LLO

(57) ABSTRACT

A computer-implemented method includes receiving a description associated with a business process workflow via a graphical user interface, the description comprising a process flow diagram; and causing a processor to generate at least one of a software application or a natural language description of the business process workflow based upon the description.

1 Claim, 2 Drawing Sheets

(56) References Cited

U.S. PATENT DOCUMENTS

| | | | | |
|---|---|---|---|---|
| 7,917,888 B2 * | 3/2011 | Chong | | G06F 8/20 717/102 |
| 7,953,619 B2 | 5/2011 | Heredia et al. | | |
| 7,957,992 B2 | 6/2011 | Gilbert et al. | | |
| 8,015,051 B2 | 9/2011 | Chen et al. | | |
| 8,041,588 B2 | 10/2011 | Gilbert et al. | | |
| 8,065,606 B1 * | 11/2011 | Gralnick | | G06F 17/2205 715/200 |
| 8,209,259 B2 | 6/2012 | Graham, Jr. et al. | | |
| 8,271,547 B2 | 9/2012 | Taylor et al. | | |
| 8,275,717 B2 | 9/2012 | Ullman et al. | | |
| 8,280,755 B2 | 10/2012 | Stuhec et al. | | |
| 8,438,310 B2 | 5/2013 | Muilenburg et al. | | |
| 8,499,279 B2 * | 7/2013 | Gupta | | G06F 8/24 717/105 |
| 9,076,311 B2 * | 7/2015 | Rachamadugu | | G06F 17/30017 |
| 2001/0044738 A1 * | 11/2001 | Elkin | | G06F 8/34 705/7.15 |
| 2002/0123957 A1 * | 9/2002 | Notarius | | G06Q 30/06 705/37 |
| 2004/0103396 A1 | 5/2004 | Nehab | | |
| 2005/0251436 A1 | 11/2005 | Moffat et al. | | |
| 2005/0273352 A1 | 12/2005 | Moffat et al. | | |
| 2006/0059253 A1 * | 3/2006 | Goodman | | G06Q 10/06 709/223 |
| 2006/0069605 A1 * | 3/2006 | Hatoun | | G06Q 10/06 705/7.15 |
| 2006/0095413 A1 | 5/2006 | Moffat et al. | | |
| 2006/0229924 A1 * | 10/2006 | Aron | | G06Q 10/06316 705/7.26 |
| 2008/0120153 A1 | 5/2008 | Nonemacher et al. | | |
| 2009/0070698 A1 * | 3/2009 | Shurtleff | | G06Q 10/06375 715/772 |
| 2009/0070749 A1 | 3/2009 | Solimano | | |
| 2010/0082378 A1 | 4/2010 | Isaacs | | |
| 2010/0257015 A1 * | 10/2010 | Molander | | G06Q 10/06 705/7.21 |
| 2011/0078426 A1 * | 3/2011 | Stoitsev | | G06F 8/10 712/244 |
| 2011/0184870 A1 * | 7/2011 | Angel | | G06F 8/34 705/301 |
| 2012/0109882 A1 * | 5/2012 | Bouse | | H04L 67/306 707/607 |
| 2012/0198457 A1 * | 8/2012 | Leonelli | | G06F 8/34 718/102 |
| 2013/0298104 A1 * | 11/2013 | Kletsky | | G06F 8/70 717/102 |

OTHER PUBLICATIONS

Maureen Fleming, Jeff Silverstein; Competitive Review of Business Process Management Software; IDC Corporate.

* cited by examiner

BUSINESS PROCESS WORKFLOW SYSTEM

BACKGROUND

Generally, a business process includes activities or tasks for providing a service and/or producing a product for a customer or customers.

SUMMARY

A computer-implemented method includes receiving a description associated with a business process workflow via a graphical user interface, the description comprising a process flow diagram; and causing a processor to generate at least one of a software application or a natural language description of the business process workflow based upon the description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
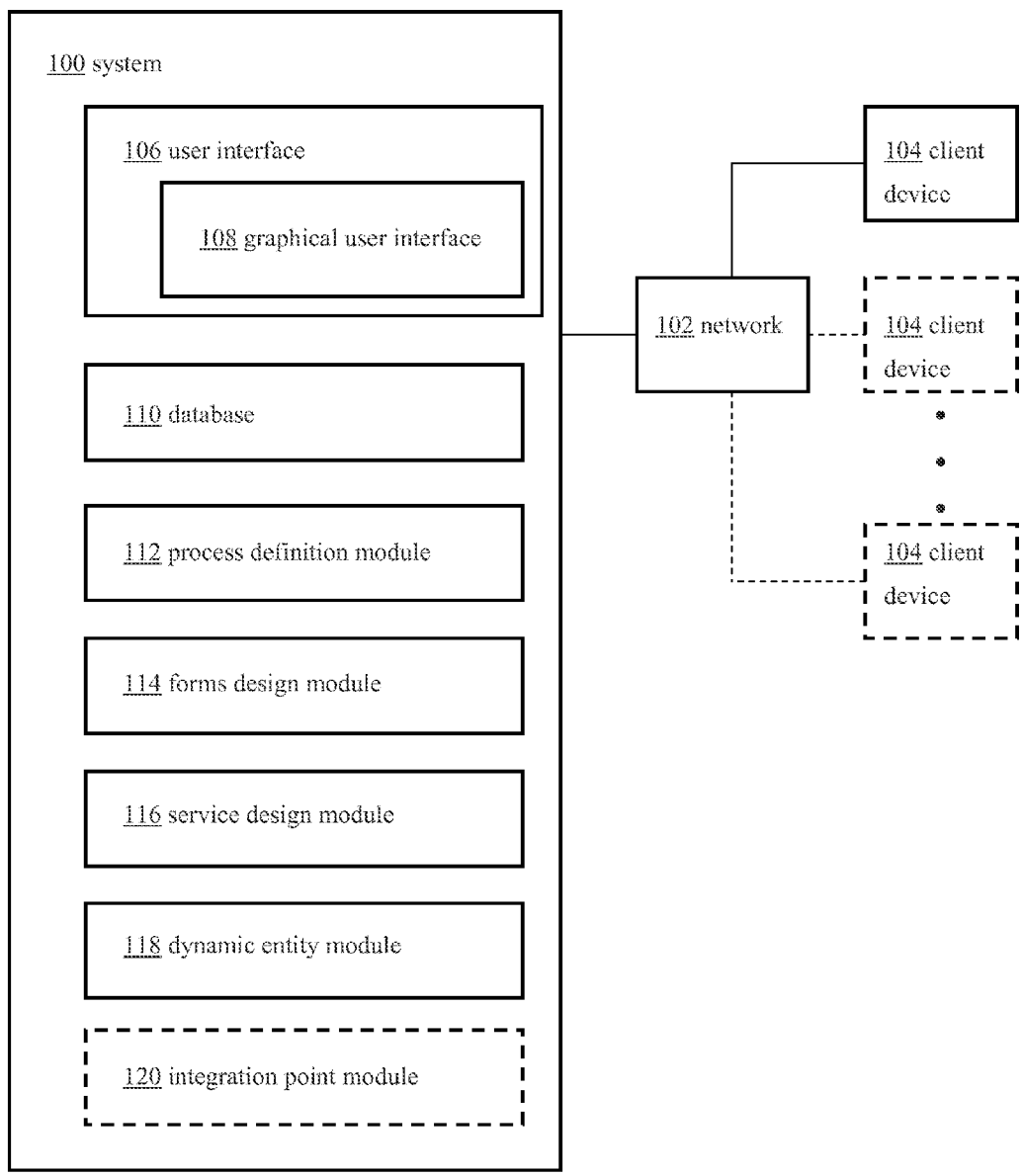
FIG. 1 is a block diagram illustrating a system configured to provide an application development environment for developing a software application in accordance with example embodiments of the present disclosure.
Figure 2:
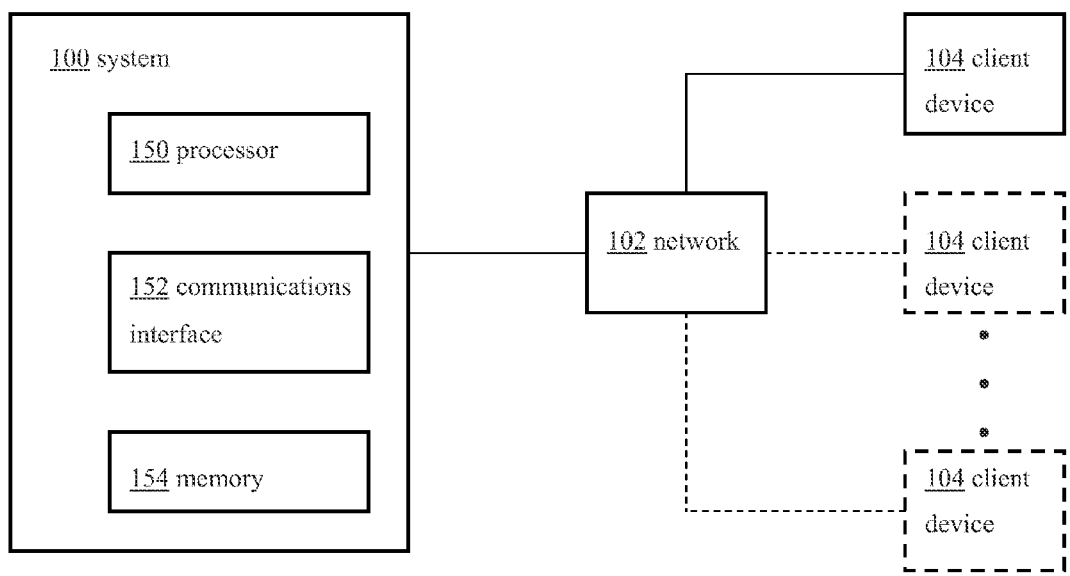
FIG. 2 is another block diagram of the system illustrated in FIG. 1.

Referring to FIGS. 1 and 2, a system 100 is described. The system 100 is configured to connect to a network 102 and provide one or more client devices 104 with a user interface 106. The user interface 106 is configured to provide an application development environment for developing software applications. A client device 104 can be an information handling system device including, but not necessarily limited to: a mobile computing device (e.g., a hand-held portable computer, a personal digital assistant (PDA), a laptop computer, a netbook computer, a tablet computer, and so forth), a mobile telephone device (e.g., a cellular telephone, a smartphone), a portable media player, a multimedia device, an e-book reader device (eReader), a surface computing device (e.g., a table top computer), a Personal Computer (PC) device, and so forth. One or more client devices 104 can be associated with a user. A user can communicate with the system 100 via a client device 104.

In embodiments of the disclosure, the system 100 communicates with a client device 104 using an application protocol, such as hypertext transfer protocol (HTTP). For example, the system 100 provides a client device 104 with a user interface 106 comprising a web page that can be accessed using a web browser and displayed on a monitor and/or a mobile device. The web page can be provided using a hypertext markup language (HTML) and/or extensible HTML (XHTML) format, and can provide navigation to other web pages (e.g., via hypertext links). The web page can also use other resources such as style sheets, scripts, images, and so forth. However, this configuration is provided by way of example only and is not meant to be restrictive of the present disclosure. In other embodiments, content may be served to a client device 104 using another application protocol. For instance, a third-party web site (e.g., a web site not operated and/or maintained by the system 100) can include content from the system 100 (e.g., embedded in a web page provided by the third-party).

The system 100 is configured to receive information associated with business process workflow, which is provided to the system 100 via the user interface 106. The user interface 106 is configured to allow a user to enter information associated with business process workflow using a graphical user interface (GUI) 108. In embodiments of the disclosure, the GUI 108 facilitates drag-and-drop outline mapping to create a process flow diagram (e.g., a flow chart) of a business process. The information associated with business process workflow can include, but is not necessarily limited to: identification of one or more users involved in a business process, information to be conveyed to one or more users, a decision to be received from one or more users, an authorization to be received from one or more users, work product to be produced by one or more users, a work product template, and so forth. In embodiments of the disclosure, the system 100 accesses internal and/or external applications via application programming interface (API) document calls, structured query language (SQL) database queries, and so forth. Further, processes hosted by and/or initiated via the system 100 can be communicatively coupled (e.g., chained together).

The system 100 includes a process definition module 112, which is used to define information associated with business process workflow. For example, the GUI 108 provides a drag-and-drop interface configured to allow a user to select (e.g., drag) business process steps and/or business process functions to define business process workflow. The information associated with business process workflow received by the process definition module 112 is stored in a database 110. In embodiments of the disclosure, the database 110 implements a relational database management system (RDBMS), which is accessed using an SQL database query. The system 100 also includes a forms design module 114, which is used to design a form (e.g., an HTML form) that describes business process workflow. A form designed using the forms design module 114 is stored in the database 110 and can be accessed using, for example, an SQL database query.

The system 100 further includes a service design module 116, which is used to provide input forms for the forms design module 114. The input forms can be configured using API document calls and supplied to the forms design module 114. The input forms can be stored in the database 110 and accessed using, for example, an SQL database query. The system 100 also includes a dynamic entity module 118, which can be used to create forms that are mirrored in the database 110. The forms created using the dynamic entity module 118 can also be stored on one or more of the client devices 104. In some embodiments, the system 100 includes an integration point module 120, which allows a user to configure a web page with a more complex data representation (e.g., with respect to HTML forms designed via the forms design module 114).

In some embodiments, the system 100 is used to develop an application for business process workflow that is self-documenting. For example, within the context of a business that deals in used equipment, a user accesses system 100 and specifies a business process for trading in a used piece of equipment. For example, the user can specify a process that includes designating one or more inspection forms tailed to a particular type or model of equipment, identifying subsequent action steps based on the outcome of an inspection, providing instructions for forwarding the inspection information to a manager, and so forth. In embodiments of the disclosure, a process can be described by the user via graphical (e.g., drag-and-drop) outline mapping using the process definition module 112. Further, the system 100 can be used to provide a textual description of a business process workflow (e.g., as described using the process definition module 112). In some embodiments, text is provided using a natural language description. In this manner, the knowledge of a worker can be thoroughly documented as the worker interfaces with the system 100. It should be noted that as used herein terms such as "user," "worker," and so forth are used to describe both a particular individual (e.g., by name), as well as an individual who is associated with a particular job description (e.g., by position within a company).

A system 100, including some or all of its components, can operate under computer control. For example, a processor 150 can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A processor 150 provides processing functionality for the system 100 and can include any number of processors, micro-controllers, or other processing systems, and resident or external memory for storing data and other information accessed or generated by the system 100. The processor 150 can execute one or more software programs that implement techniques described herein. The processor 150 is not limited by the materials from which it is formed or the processing mechanisms employed therein and, as such, can be implemented via semiconductor(s) and/or transistors (e.g., using electronic integrated circuit (IC) components), and so forth.

The system 100 includes a communications interface 152. The communications interface 152 is operatively configured to communicate with components of the system 100. For example, the communications interface 152 can be configured to transmit data for storage in the system 100, retrieve data from storage in the system 100, and so forth. The communications interface 152 is also communicatively coupled with the processor 150 to facilitate data transfer between components of the system 100 and the processor 150 (e.g., for communicating inputs to the processor 150 received from a device communicatively coupled with the system 100). It should be noted that while the communications interface 152 is described as a component of a system 100, one or more components of the communications interface 152 can be implemented as external components communicatively coupled to the system 100 via a wired and/or wireless connection. The system 100 can also comprise and/or connect to one or more input/output (I/O) devices (e.g., via the communications interface 152) including, but not necessarily limited to: a display, a mouse, a touchpad, a keyboard, and so on.

The communications interface 152 and/or the processor 150 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 152 can be configured to communicate with a single network or multiple networks across different access points.

The system 100 also includes a memory 154. The memory 154 is an example of tangible, computer-readable storage medium that provides storage functionality to store various data associated with operation of the system 100, such as software programs and/or code segments, or other data to instruct the processor 150, and possibly other components of the system 100, to perform the functionality described herein. Thus, the memory 154 can store data, such as a program of instructions for operating the system 100 (including its components), and so forth. It should be noted that while a single memory 154 is described, a wide variety of types and combinations of memory (e.g., tangible, non-transitory memory) can be employed. The memory 154 can be integral with the processor 150, can comprise stand-alone memory, or can be a combination of both. The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 154 can include removable integrated circuit card (ICC) memory, such as memory provided by a subscriber identity module (SIM) card, a universal subscriber identity module (USIM) card, a universal integrated circuit card (UICC), and so on.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system or circuit. Further, elements of the blocks, systems, or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method of providing a service for defining and managing a business process workflow, the method comprising the steps of:

providing a hierarchical visual management tool implemented in a processor and operable to manage and update relational information within a hierarchy, wherein the relational information comprises identification of one or more users involved in a business process, information to be conveyed to one or more users, a decision to be received from one or more users, an authorization to be received from one or more users, work product to be produced by one or more users, and a work product template; further wherein the relational information are manipulated by a user via a plurality of graphic user interface icons graphicly indicating specific business process steps; wherein each of the plurality of graphic user interface icons are associated with specific business process steps; further wherein each of the plurality of graphic user interface icons are selectable to define a business process workflow;

embedding first embedded data within a first graphic user interface, wherein the first embedded data identifies at least a first user involved in the selected business process;

embedding second embedded data within a second graphic user interface, wherein the second embedded data identifies a decision to be received by the first user;

embedding third embedded data within a third graphic user interface, wherein the third embedded data is comprised of identification of an authorization to be received from a second user;

embedding fourth embedded data within a fourth graphic user interface, wherein the fourth embedded data is comprised of data identifying a first work product to be produced by a third user;

embedding fifth embedded data within a fifth graphic user interface, wherein the fifth embedded data identifying a work product template;

receiving embedded data from the selection of one or more of the plurality of graphic user interface icons;

transforming the received embedded data into a plurality of business process workflow functions;

transforming the business process workflow functions into a natural language textual description of the business process flow;

generating a plurality of API document calls based on received embedded data and one or more of the plurality of business process workflow functions;

receiving a plurality of API responses containing API response data;

producing an HTML form, wherein the HTML form is created based at least in part on the received embedded data, and at least one business process workflow function; and generating an input form for required HTML form data, wherein the input form is generated based at least in part using embedded data, API response data and at least one business process workflow function.

* * * * *